United States Patent [19]
Grosse

[11] 3,784,026
[45] Jan. 8, 1974

[54] CONNECTING ELEMENTS FOR WIRE FRAMES

[76] Inventor: Wolfgang C. F. Grosse, Seestrasse, Au near Zurich, Switzerland

[22] Filed: Apr. 10, 1972

[21] Appl. No.: 242,484

[30] Foreign Application Priority Data
Apr. 22, 1971 Germany.................. P 21 19 585.7

[52] U.S. Cl.................. 211/181, 211/182, 24/123 G
[51] Int. Cl.............................................. A47f 5/14
[58] Field of Search............................ 211/181, 182; 287/54 C, 49; 24/123 G, 123 H, 115 J, 115 K, 127, 118, 214, 107, 248 SL, 255 SL, 81 CC, DIG. 25, 73 PB; 248/67.5, 65

[56] References Cited
UNITED STATES PATENTS

| | | | |
|---|---|---|---|
| 2,466,148 | 4/1949 | Birr | 287/54 C X |
| 3,050,578 | 8/1962 | Huebner | 24/81 CC X |
| 3,210,820 | 10/1965 | Humiston | 24/214 X |
| 3,616,499 | 11/1971 | Lowery | 24/123 G |

FOREIGN PATENTS OR APPLICATIONS
28,851    8/1964    Germany.................. 24/255 SL

*Primary Examiner*—Ramon S. Britts
*Attorney*—Michael S. Striker

[57] ABSTRACT

A connecting element similar to a snap fastener for securing two to four laterally adjacent and/or superimposed wire frames at their upper and/or lower end corners to each other, the connecting element including a pair of opposed members having projection means abutting the corners of the frames.

12 Claims, 6 Drawing Figures

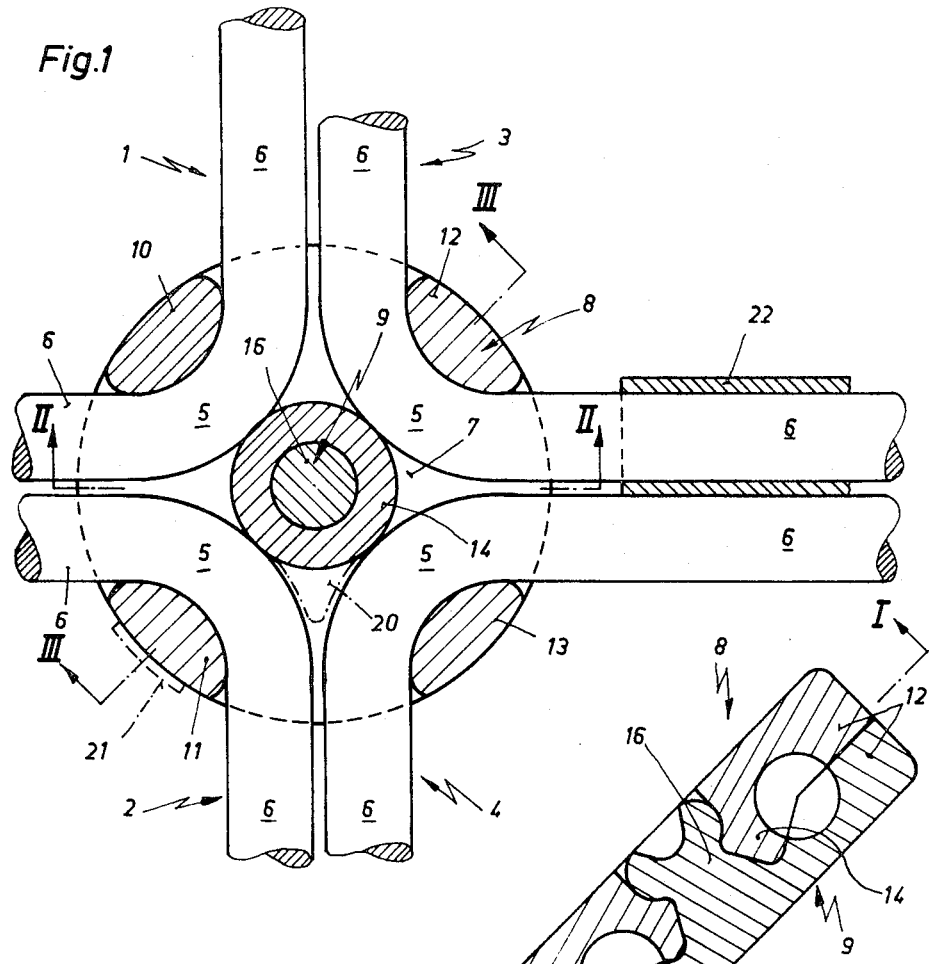
Fig.1
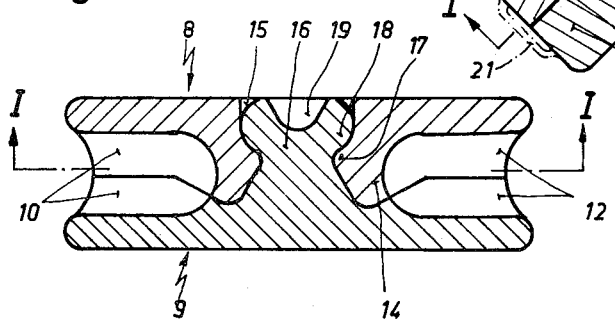
Fig.2
Fig.3

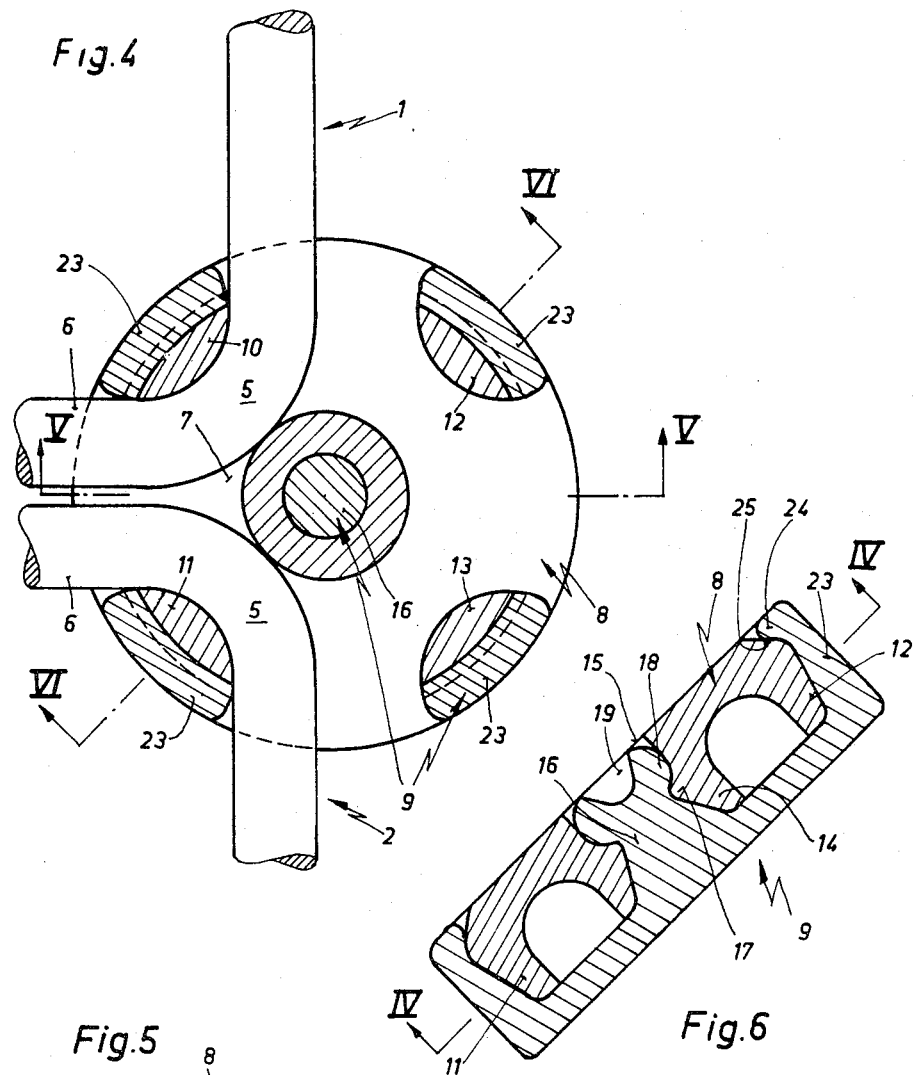

CONNECTING ELEMENTS FOR WIRE FRAMES

The present invention relates to elements for connecting the angular, preferably rounded, end corners of laterally adjacent and/or superimposed wire frames to each other. More particularly the invention relates to means for connecting wire frames to each other into which drawers or boxes of plastic are slidable in which notes, letters or the like and especially letters of a standard business size may be deposited. Such wire frames are in practical use, for example, in three different heights for receiving, for example, three, five or seven slidable drawers. In order to connect such wire frames so as to form higher and/or wider units, suitable connecting means are required. Often it is also desirable, for example, for sorting mail, to connect a plurality of small units into a larger unit so as to form a larger sorting table or the like or to combine them with each other so as to form a scaffold which may be secured as a single unit with fewer fasteners, for example, to a wall, as would be required for securing a plurality of individual unconnected wire frames.

It is the object of the present invention to provide for these purposes a simple connecting element which takes up very little space, functions very reliably, may be easily mounted, and secures the respective wire frames securely to each other so that they cannot be lifted or lowered from each other or slide forwardly or rearwardly or toward the left or right from each other.

For attaining this object, the invention provides a connecting element which consists of two members which are adapted to be easily connected to each other in a direction transverse to the plane of the mentioned corners of the wire frames which are to be connected to each other. These members are provided with at least three projections which extend transverse to the connecting plane of the wire frames and two of which engage upon the inner side of the adjacent corners of two wire frames, while the third projection engages upon the outer side of both corners. These three projections reliably secure the two wire frames to each other and prevent the frames from being shifted either upwardly or downwardly or toward the right or left from each other, while in the third direction, that is, transverse to the connecting plane, the two wire frames will be held together by the connection of the two members of the connecting element to each other.

A further important improvement of the connecting element according to the invention consists in providing this element with five projections, four of which are uniformly spaced from each other within the periphery of a circle and each of which is adapted to be applied upon the inner side of one of four adjacent corners of four wire frames which are to be connected to each other, while the fifth projection is located centrally of the other four projections and is adapted to be inserted into the space between the four, preferably rounded wire corners of the four wire frames and then to engage upon the outer sides of these four corners. For producing such wire frames, it is in any event desirable to bend the wires so as to form at least slightly rounded corners rather than to bend them at sharp right angles. The free space which is then formed between the corresponding rounded corners forming an intersection of four adjacent and/or superimposed wire frames is used according to the invention for inserting the central projection of the connecting element which then abuts against the outer rounded corners of all four wire frames and presses the inner rounded corners against the four outer projections. In this manner, the connecting element according to the invention utilizes the available, otherwise useless space between the rounded corners of the adjacent wire frames and it may also be made of a very small size so as to be hardly noticeable and will firmly connect the adjacent frames securely to each other without danger that either the frames or the connecting element or elements will be subjected to any undue stresses.

If desired, the four wire frames may thus be connected laterally adjacent to and/or above each other without any intermediate spaces. Instead of rounding the intersecting corners of four adjacent wire frames to attain the space for inserting the central projection of the connecting element, these corners may also only be beveled. They may even be made sharply rectangular if the adjacent wire frames be separated from each other by suitable spacing means between the parallel wires of the adjacent frames and/or by making the central projection of the connecting element of a suitable shape.

The two members of each connecting element are preferably designed so as to be tightly clamped together centrally and/or at their outer edges. According to a preferred embodiment of the invention, these two members are designed so as to snap into each other like the two members of a snap fastener. The snaplike interengaging parts may either consist of a central head on one member which snaps into a corresponding aperture or recess in the other member or by providing one or both members with outer weblike projections which snap over the other member. Depending upon the diameter of the connecting element, it is also possible to provide the central projection with an aperture through which, for example, a rivet or screw may be inserted for securing the two members to each other so as to be normally inseparable or for securing the connecting element, and thus the wire frames as well, for example, to a wall or table surface.

The entire connecting element is preferably molded of a resilient plastic, and the two members thereof may also be provided with a small web which is molded on or secured to one outer part of both members and connects the two members to each other so as to prevent either of them from being lost or from being mixed up with a connecting member of a different size or shape which does not match with the other member.

According to a further embodiment of the invention, the connecting element is associated with resilient sleeves which are preferably slotted longitudinally for being easily applied upon at least one of two parallel wires of two adjacent wire frames near the intersecting corners of the frames for spacing these wires resiliently from each other. These resilient sleeves not only increase the size of the space between the adjacent corners of, for example, four wire frames so as to permit the central projection of the connecting element to be made of a larger diameter and greater strength, but they also prevent any movement of the individual projections of the connecting element relative to each other. For this purpose, the projections may also be slightly conical in a direction transverse to the connecting plane. Such resilient spacing sleeves may also be originally provided on the outer bottom wires of each wire frame. If they are not required in combination with a connecting element according to the invention, they will serve as antiskid means when the wire frames are supported on a table surface or the like.

The features and advantages of the present invention will become more clearly apparent from the following detailed description thereof which is to be read with reference to the accompanying diagrammatic drawings of two different embodiments of the invention, each of which is enlarged to about three times its actual size and in which FIG. 1 shows a cross section which is taken along the line I — I of FIGS. 2 and 3 of a first embodiment of the invention;

FIG. 2 shows a cross section which is taken along the line II — II of FIG. 1;

FIG. 3 shows a cross section which is taken along the line III — III of FIG. 1;

FIG. 4 shows a cross section which is taken along the line IV — IV of FIGS. 5 and 6 of a second embodiment of the invention;

FIG. 5 shows a cross section which is taken along the line V — V of FIG. 4; while FIG. 6 shows a cross section which is taken along the line VI — VI of FIG. 4.

Referring to the drawings, FIGS. 1 to 3 illustrate a connecting element according to a first embodiment of the invention in which in FIG. 1 this connecting element connects four wire frames 1, 2, 3 and 4 to each other two of which, i.e., the frames 1 and 3, are preferably mounted above and on the two other frames 2 and 4, while FIGS. 4 to 6 illustrate a connecting element according to a second embodiment of the invention, in which in FIG. 4 this connecting element connects only two wire frames 1 and 2 to each other one of which is preferably likewise disposed above the other. FIGS. 1 and 4 only show one rounded corner 5 and the adjacent straight wire sections 6 of each of these wire frames. When four of these rounded wire corners 5 are connected and these corners and the adjacent straight wire parts 6 are slightly spaced from each other, as shown in FIG. 1, a free, substantially star-shaped space 7 is formed between them.

When speaking hereafter of the "connecting plane", the plane of the drawings of FIGS. 1 and 4 is to be understood which coincides with the plane I — I or IV — IV in which the cross sections according to FIGS. 2 and 3 or FIGS. 5 and 6 are taken, respectively.

The connecting element according to the invention consists of two members 8 and 9 which are adapted to be connected to and separated from each other within a plane transverse to the mentioned connecting plane I — I or IV — IV, respectively. According to FIGS. 1 to 3, both members 8 and 9 together are provided with four projections 10, 11, 12 and 13 which are peripherally spaced at equal distances from each other and each of these projections is adapted to engage upon the rounded inner side of one of the wire corners 5 of the four wire frames 1 to 4. As shown in FIGS. 2 and 3, approximately one half of each of the projections 10 to 13 is integral with one or the other member 8 or 9. Member 8 is further provided with a central fifth projection 14 which has a minimum outer diameter in accordance with the distance in the space 7 between the diametrically opposite wire corners 5 of the four wire frames 1 to 4 and, as shown in FIG. 1, it engages with the outer surfaces of all of these corners 5. The five projections 10 to 14 are adapted to connect the four wire frames 1 to 4 so as to be immovable in any direction relative to each other.

The central projection 14 on the member 8 is provided with a central aperture 15 into which a central head 16 which projects from the other member 9 is adapted to engage. The walls of the central aperture 15 and the head 16 are provided with inclined or rounded shoulders 17 and 18 which are adapted to snap into each other like the two members of a snap fastener. The two members 8 and 9 consist of a resilient plastic. For snapping more easily into the aperture 15, the free end of the head 16 is provided with a central recess 19. The shoulders 17 and 18 are inclined or rounded in such a manner that the members 8 and 9 can also be separated from each other like the two members of a snap fastener.

FIG. 1 also shows in dot-and-dash lines a modification 20 of the central projection 14 which is provided at diametrically opposite points with concave webs 20 (only one of which is indicated) so as to have a starlike cross section. The rounded wire corners 5 then engage almost entirely with the projection 14 rather than only at diametrically opposite points.

FIGS. 1 and 3 further indicate in dot-and-dash lines a connecting web 21 the opposite ends of which are integral with or secured to one of the projections 10 to 14 of both members 8 and 9 so as to connect these members like a hinge to each other to prevent either of them from getting lost when they are unsnapped from each other.

The lower wire section 6 of each upper wire frame 1 and 3 carries a slightly resilient sleeve 22 which is preferably slotted longitudinally and may thus be easily applied and which spaces each upper wire frame 1 or 3 resiliently from the lower frame 2 or 4. The projections 10 to 14 and the sleeves 22 are made of such shapes and dimensions that, when the wire frames 1 to 4 are connected to each other, the sleeves 22 will be slightly compressed and no movement will occur between the projections of the connecting element.

In the embodiment of the invention as illustrated in FIGS. 4 to 6, those parts of the connecting element which carry out the same functions as the corresponding parts in the embodiment according to FIGS. 1 to 3 are also designated by the same reference numerals. The projections 10 to 13 are integral with the member 8 which is provided with the central projection 14 in the same manner as the member 8 of the connecting element according to FIGS. 1 to 3 which also serves for the insertion of the head 16 of the other member 9 and the locking engagement of the two members like those of a snap fastener.

The embodiment of the invention as shown in FIGS. 4 to 6 also differs from that according to FIGS. 1 to 3 by making the projections 10 to 13 on the member 8 of a smaller outer diamter and by providing the other member 9 at these points with projections 23 extending in the opposite direction to the projections 10 to 13 and tightly surrounding the same and having rim portions 24 which project inwardly in the direction toward the head 16 and are adapted to snap into recesses 25 in the upper outer edges of the member 8, as shown in FIG. 6. The two members 8 and 9 of the connecting element thus grip each other tightly also at their outer edges. The inner rim portions 24 and the walls of the recesses 25 are beveled or rounded so as to permit them to slide along and disengage from each other when the two members 8 and 9 are pulled apart like the members of a snap fastener.

FIG. 5 further indicates in dot-and-dash lines a hole 26 which may extend centrally through the head 16 and permits, for example, a rivet to be inserted one head of which projects radially over the head 16 and upon the upper surface of the member 8 for securing the two members 8 and 9 rigidly to each other or permits a screw to be inserted for securing the wire frames to a table or wall surface. Instead of engaging upon the outer side of the member 8, the head of the rivet or screw may also be conical and inserted into the recess 19 of the head 16 of the member 9 so as to exert an outwardly directed wedging action upon the wall of this recess 19 and thus press the head 16 tightly against the wall of the recess 19 in the other member 8.

As illustrated in FIG. 4, the connecting element according to the invention may also be employed for only connecting two or three wire frames to each other. The actual connecting element has again only about one third of the size of the connecting element as illustrated in FIGS. 4 to 6 and its individual parts therefore protrude only very little. If it is to be provided with a hole 26 for securing its two members rigidly together or for securing it together with the wire frames to a table or wall surface, it may be made of slightly larger dimensions. The wire frames may then either be spaced at a larger distance from each other or their corners may be rounded so as to have a larger radius. The connecting elements according to the invention may be employed for combining any number of individual frames into a large frame unit. In the same manner it is also possible to connect conventional mail sorting frames, compartments, baskets or the like to each other and/or to secure them to a wall or table surface. The connecting element may then also be employed for securing a single wire corner to a wall or the like.

Finally, in place of the two snap-fastenerlike members 8 and 9 it is also possible to employ other types of connection, for example, adhesive connections which cannot again be severed from each other or only by breaking them or screwed connections in which one connecting member only forms a cover like the member 9 as shown in FIG. 4 to 6.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A connecting element for securing one corner of each of at least two adjacent angle elements of wire frames to each other within a common connecting plane, each of said angle elements having two arms angularly connected to each other at said corner, said connecting element comprising two connecting members having cooperating means permitting said members to be releasably connected to each other in a direction transverse to said connecting plane, at least one of said members having at least three projections positioned substantially at the corners of a triangle and each of said projections extending transverse to said plane from one towards the other member, each of two of said projections being adapted to abut on the inner side of one of said corners of one angle element against each of both of said arms thereof and to support each of said angle elements against movement in two directions which extend transverse to each other, and the third projection being adapted to abut on the outer side of said corners against both angle elements, serving as a common support for both of said angle elements against movement in a third direction.

2. A connecting element as defined in claim 1, wherein each of said connecting members is integrally formed with said at least three projections, at least one of said three projections on one of said connecting members is formed with a passage extending substantially normal to said plane therethrough, and the corresponding projection on the other connecting member extending through said passage.

3. A connecting element as defined in claim 1, in which at least one of said connecting members has five of said projections, four of said projections being equally spaced peripherally from each other within a circle and form outer projections and the fifth projection being disposed centrally of said outer projections, each of said outer projections being adapted to abut on the inner side of said corner of each of two to four adjacent angle elements and against each of both of said arms thereof, while said central projection is adapted to abut on the outer side of said corners against both arms of all of said adjacent angle elements.

4. A connecting element as defined in claim 1, wherein each of said connecting members has five of said projections, four of which being arranged along a circle equally circumferentially spaced from each other and a fifth of which being arranged at the center of said circle, said four projections on one of said members overlapping said four projections on the other member and holding said members together by snap action.

5. A connecting element as defined in claim 1, in which at least one of said projections is entirely integral with one of said connecting members.

6. A connecting element as defined in claim 1, in which at least one of said projections is divided into two parts, each of said parts being integral with one of said connecting members and projecting toward the other part on the other member.

7. A connecting element as defined in claim 1, in which said two connecting members are adapted to be tightly clamped to each other.

8. A connecting element as defined in claim 7, in which said two connecting members are designed so as to permit them to be clamped to and separated from each other like the two members of a snap fastener.

9. A connecting element as defined in claim 3, in which said corners are rounded and said central projection has a starlike cross section by having radial extensions the sides of each of which are concavely curved substantially in accordance with the curvature of the outer sides of the adjacent corners of two of said frames.

10. A connecting element as defined in claim 3, in which a central aperture extends through said element into which a fastener may be inserted for preventing said two connecting members from being separated from each other and/or for securing said connecting element together with said angle elements to a fixed surface.

11. A connecting element as defined in claim 1, in which both of said connecting members are molded of a resilient plastic.

12. A connecting element as defined in claim 1, further comprising a resilient connecting web securing said two connecting members at one point to each other so as to remain together when otherwise separated from each other.

* * * * *